HIGH VOLTAGE STORAGE MODULE, PULSE GENERATOR AND SYSTEM

Filed Sept. 30, 1964 Sheet 1 of 4

ROBERT L. ANDERSON
WALTER P. DYKE
FRANK J. GRUNDHAUSER
J KENNETH TROLAN
INVENTORS

BY

BUCKHORN, BLORE, KLARQUIST & SPARKMAN

ATTORNEYS

ROBERT L. ANDERSON
WALTER P. DYKE
FRANK J. GRUNDHAUSER
J KENNETH TROLAN
INVENTORS
BY
BUCKHORN, BLORE, KLARQUIST & SPARKMAN
ATTORNEYS

HIGH VOLTAGE STORAGE MODULE, PULSE GENERATOR AND SYSTEM

Filed Sept. 30, 1964

ROBERT L. ANDERSON
WALTER P. DYKE
FRANK J. GRUNDHAUSER
J KENNETH TROLAN
INVENTORS

BY

BUCKHORN, BLORE, KLARQUIST & SPARKMAN
ATTORNEYS

ROBERT L. ANDERSON
WALTER P. DYKE
FRANK J. GRUNDHAUSER
J KENNETH TROLAN
INVENTORS.
BY
BUCKHORN, BLORE, KLARQUIST & SPARKMAN
ATTORNEYS 3,432,663

HIGH VOLTAGE STORAGE MODULE, PULSE GENERATOR AND SYSTEM

Robert L. Anderson, Walter P. Dyke, Frank J. Grundhauser, and J Kenneth Trolan, McMinnville, Oreg., assignors to Field Emission Corporation, McMinnville, Oreg., a corporation of Oregon Filed Sept. 30, 1964, Ser. No. 400,392
U.S. Cl. 250—98 9 Claims
Int. Cl. H05g *1/24;* F23q *7/02;* H05b *41/36*

ABSTRACT OF THE DISCLOSURE

A high energy electrical pulse generation system is described in which fifteen pulse generator units are simultaneously discharged in parallel through a common load to produce a final output pulse of 300 kilovolts and 75,000 amperes having a rise time of 8 nanoseconds and a width of 50 nanoseconds. The pulse generator units each include a plurality of storage modules containing artificial transmission lines formed by capacitors and inductors embedded in elongated rectangular blocks of plastic having two spark gap electrodes extending from one end which are directly attached to the plates of the output capacitor and provide a plurality of spark gaps positioned in a common light path. Ultraviolet light is transmitted from a single source through a window in the housing of each pulse generator unit to one of its spark gaps in order to cause all of the spark gaps to break down substantially simultaneously. This discharges the transmission lines in series to produce pulses of 300 kilovolts and 5000 amperes with a rise time of about 5 nanoseconds at the outputs of the units at approximately the same time in order to form the final output pulse of the system across the common load. The common load can be an exploding wire or an electron discharge device, such as an X-ray tube having a field emission cathode.

The subject matter of the present invention relates generally to the generation of narrow, fast rise time electrical pulses of high voltage and high current, and relates in particular to electrical storage modules containing transmission lines, to pulse generators formed by a plurality of such storage modules connected at their output ends by spark gaps, and to a system employing a plurality of such pulse generators having their outputs connected in parallel to a common load. The transmission lines of the storage modules are charged through isolating inductances connected to their input ends, and discharged substantially simultaneously by irradiating one of the spark gaps of each pulse generator with a single source of ultraviolet light or other electromagnetic radiation to ionize the gas in such one gap and to cause all of the spark gaps to break down at essentially the same instant of time in a manner hereafter described. This substantially simultaneous discharge of transmission lines enables the electrical energy stored in such lines to be transmitted to the output terminal of each pulse generator as electrical pulses having a voltage of 50 to 300 kilovolts and a current of about 6000 amperes with a rise time on the order of 5 nanoseconds.

The pulse generator and storage modules of the present invention are particularly useful in a system for the explosion of wires or foils of metal. The exploding wires may be employed as high intensity light sources and also enable the study of the high temperature plasma produced by such explosion. However, the pulse generator of the present invention may also be employed in any other application where short pulses of high voltage and high current are required, such as to pulse electron discharge devices including field emission X-ray tubes used in the production of high intensity X-ray pulses by vacuum arc operation or other modes of X-ray generation. These high voltage pulses may be applied between the anode and cathode of an X-ray tube to cause the field emission of electrons from such cathode and the production of a vacuum arc to bombard such anode by such electrons to produce high intensity X-ray pulses.

In order to produce the desired high temperature plasma of electrons, ions and metal vapor by exploding wires, it is necessary to transfer an extremely large amount of electrical energy in a very short time to the wire in order to heat such wire to the highest possible temperature before it explodes. While it has previously been possible to store large amounts of electrical energy in electrical capacitors, previous devices have not been able to deliver this stored energy to the exploding wire in a short enough time to produce the desired results. Previous circuits have not been able to accomplish the desired results because they have included too much inductance. A system capable of delivering 1000 joules of energy within 50 nanoseconds having a rise time less than 8 nanoseconds may produce a current of 75,000 amperes at 300 kilovolts with rate of change of current in the order of $$7.5 \times 10^{+12}$$

amperes per second so that the allowed circuit inductance is only about $14 \times 10^{-9}$ henry. In order to avoid this problem previous systems either resorted to longer pulse length and rise time, or to lower current resulting in lower wire temperature, or increased the output voltage to lower the required current to that permissible with the higher inductance of a simple series circuit. However, at these higher potentials the danger of voltage breakdown is materially increased so that the stored energy may be discharged to the casing of the pulser unit or some other undesirable element, rather than to the exploding wire.

The pulse generator system of the present invention overcomes these disadvantages by employing a plurality of pulser units which are connected at their output terminals in parallel to divide the total load current among the several individual pulser units in order to reduce the discharge current required for each pulser unit to a level which can be conveniently supplied. This parallel discharge circuit also reduces the total inductance of the system because the inductances of each of the pulser units are connected in parallel, and the effect of the individual pulser unit inductance is reduced because of the lower discharge current flowing through such units. The inductance of the individual pulser units is further decreased by reducing the output inductance of each of the plurality of storage modules employed in such pulser units. This is accomplished by mounting the spark gap electrodes of the storage modules directly on the plates of the output capacitor of the lumped constant transmission line formed by each of such modules.

The improved storage modules of the present invention are of a simple, compact and economical construction, and provide a distributed or lumped constant transmission line of superior storage characteristics. These storage modules are mounted in stacked relationship with the spark gap electrodes of adjacent modules forming a plurality of spark gaps which are positioned in a common light path. An ionizable gas, such as nitrogen, which emits ultra violet light when ionized is provided in the spark gaps. All of these spark gaps are caused to break down substantially simultaneously in a very short time interval by exposing the gas in one of the spark gaps to a trigger pulse of ultra violet light. Additional ultra violet light is emitted from the ionized gas of such one spark gap and is transmitted to the adjacent remaining spark gaps in order to cause the gas within the remaining spark gaps to break down at substantially the same time. The exact breakdown process is not completely understood but there is reason to believe that it is caused by a combination of ultra violet light and photo electron emission from adjacent solid elements, such as the surfaces of the spark gap electrodes, as well as over voltage breakdown. It should be noted that even though over voltage breakdown may cause the spark gaps to ionize in sequence, the action of the ultra violet light reduces the time required for ionization of the gas and causes the sequential breakdown to take place at a much faster rate than when over voltage breakdown alone is employed, so that all of the spark gaps in the present pulser unit break down substantially simultaneously. At least some of the storage modules are provided with an adjustable electrode to vary the width of the spark gaps between such modules easily and accurately in order to control the breakdown voltages of such spark gaps. The pulser unit of the present invention is an improvement over that discussed in copending U.S. patent application Ser. No. 103,796, entitled "High Voltage Pulser" filed by W. P. Dyke et al., on Apr. 18, 1961, now Patent No. 3,248,574.

A common source of ultra violet light or other radiation capable of causing photo electron emission is employed for a plurality of pulser units forming part of a pulse generator system and is positioned so that the trigger pulse of such radiation is transmitted simultaneously through an opening in the side of the casing of each of the pulser units. This causes the spark gaps between adjacent storage modules in each of the pulser units to break down substantially simultaneously so that the storage modules are discharged in a series circuit provided by the spark gaps to produce a plurality of fast rise time electrical pulses of high current and high voltage with negligible time jitter at the output terminals of the pulser units. The output pulses of the pulser units are combined into a single fast rise time pulse of extremely high current which is transmitted through the common coaxial transmission line to the wire or foil to be exploded.

It is therefore one object of the present invention to provide an improved pulse generator for producing narrow high voltage electrical pulses of high current and fast rise time.

Another object of the invention is to provide an improved storage module of simple and economical construction containing a lumped or distributed constant transmission line having a very low output inductance and an adjustable spark gap.

A further object of the present invention is to provide an improved pulse generator including a plurality of storage modules which are discharged substantially simultaneously by positioning the spark gaps between adjacent storage modules in a common light path and ionizing the gas in one of such spark gaps to emit radiation from such one spark gap and to cause the remaining gaps to break down at essentially the same time.

Still another object of the invention is to provide an improved high voltage, high current pulse generator of small size and reduced weight.

A still further object of the invention is to provide an improved system for producing a narrow, fast rise time output pulse of high voltage, high current in which a plurality of similar pulser units are employed with their outputs connected in parallel to reduce the discharge current required from each pulser unit and to reduce the total inductance of the system, each of such pulser units including a plurality of storage modules which contain transmission lines that are discharged substantially simultaneously in series through a plurality of spark gaps by exposing one of the gaps of each unit to a common source of light to transmit a plurality of pulses from the outputs of such units which are added together to produce such output pulse, and are charged in parallel from a high voltage source of direct current.

Other objects and advantages of the present invention will become apparent from the following detailed description of a preferred embodiment thereof and from the attached drawings of which:

Figures 1, 2:
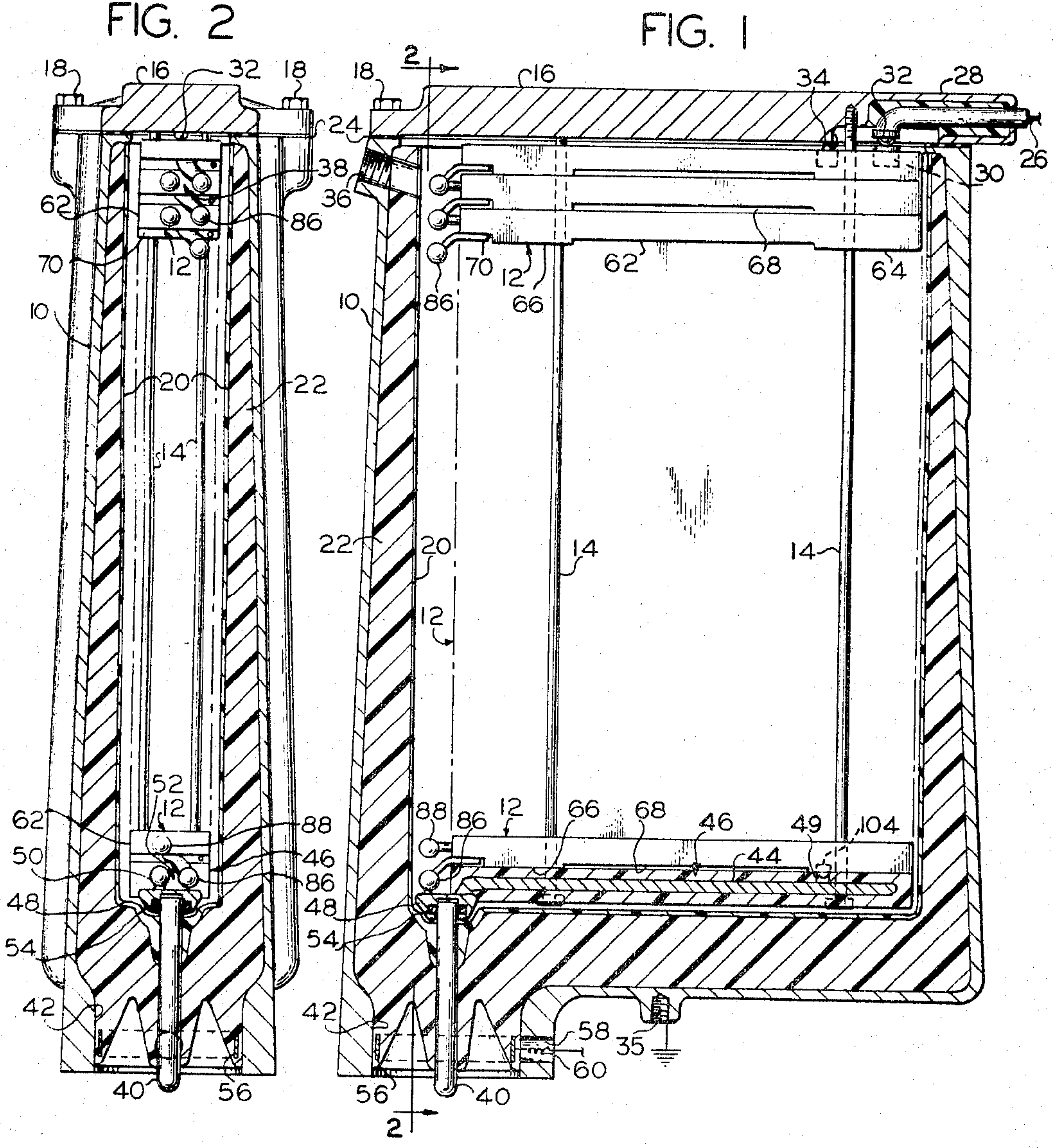
FIG. 1 is a section view of one embodiment of a pulser unit in accordance with the present invention.
FIG. 2 is a section view of the pulser unit of FIG. 1 taken along the line 2—2 with portion broken away to show the output electrode.

As shown in FIGS. 1 and 2, the pulse generator of the present invention includes a metal casing 10 and a plurality of storage modules 12 containing distributed or lumped constant transmission lines mounted within such casing. These storage modules 12 are supported in stacked alignment with one another by means of three support rods 14, of nylon or other suitable insulating material, which extend through three spaced holes in each of the storage modules and are threaded into the cover 16 of the casing to clamp such modules together. The stacked storage modules supported on the cover 16 are inserted through an opening in the top of the casing 10 and the cover is secured to the casing by bolts 18. The casing 10 is provided with a liner 20 of fiber glass or other suitable insulating material, which serves as a mold for a filling 22 of epoxy resin or other plastic potting compound between such liner and the inner surface of the casing 10. However this liner may be eliminated by employing a removable mold member. The cover 16 is provided with a gasket 24 of rubber or other resilient material to form a gas-tight seal with the top of the casing 10 and the liner 20 to provide a container that is filled with a pressurized insulator gas, such as nitrogen, at a pressure of 80 to 90 p.s.i., which emits ultra violet light when ionized. This enables the breakdown of all of the spark gaps between adjacent storage modules at substantially the same time since the ionization of the gas in one gap by a trigger pulse produces additional ultra violet light and photo emission electrons which cause all of the remaining spark gaps to ionize substantially simultaneously. It should be noted that the spark gaps may be adjusted so that over voltage breakdown is also employed to cause ionization of the spark gaps sequentially from the first to the last or output spark gap, in order to prevent wave form distortion of the output pulse due to premature breakdown of one of the gaps. In either case, all of the storage modules are discharged at approximately the same time in series through such spark gaps.

The storage modules are charged in parallel from a source of high D.C. voltage (not shown) connected to one end of an insulated charging cable 26 which extends through a tubular projection 28 in the cover 16 and is hermetically sealed thereto. The other end of the charging cable is electrically connected to a charging input terminal 30 on the upper side of the top storage module which is connected to one end of the transmission line within such module, through a spring contact 32 similar to those used between the terminals of adjacent modules as hereafter described. A ground terminal 34 on the top storage module is suitably connected through a current monitoring resistor (not shown) extending through an opening in the cover, to the casing 10 of the pulser unit which is grounded at a threaded terminal 35 in the bottom of such casing to enable the charging of all of such modules in parallel.

A threaded aperture 36 is provided in the side of the casing 10 to enable the transmission of ultra violet light or other ionizing radiation through openings in the filling 22 and liner 20 into the casing 10 along a path which intersects the spark gap 38 between electrodes of the top storage module and the next adjacent storage module. It should be noted that a pipe (not shown) is threaded into aperture 36 and extends to the source of ultra violet light so that the same gas is employed in the casing 10 of the pulse unit and such light source. When the gas of spark gap 38 ionizes due to the irradiation of such gap by a trigger pulse of ultra violet light transmitted through the aperture 36, such ionized gas emits additional ultra violet light. This additional ultra violet light is transmitted instantaneously to all of the other spark gaps between the storage modules 12 which are positioned in a common light path in order to enable the ionization of all of such spark gaps substantially simultaneously and to discharge such storage modules in series in a manner described with reference to FIG. 5. An output electrode 40 is supported by the filling 22 and liner 20 so that it extends through an opening 42 in the bottom of the casing from the interior of such liner to the exterior of such casing. The high voltage, high current output pulse of the pulser unit produced by the discharge of the storage modules, is transmitted by the male output connector 40 from such pulser unit.

An ouput inductor 44 which is enclosed in a module 46 of plastic potting compound similar in shape to that of the storage modules is mounted on support rods 14 in stacked relationship with such storage modules. One end of the output inductor 44 is connected to a female output connector 48 which has a portion molded into the module 46, and the other end of such inductor is connected by a connector button 49 to the ground contact on the lower side of the bottom storage module. The female connector 48 is an inverted cup-shaped member having an output spark gap electrode 50 attached to the top of such female connector which is spaced from the spark gap electrode of the bottom storage module 12 by a last spark gap 52. The male output connector 40 is electrically connected to the female connector 48 by a contact spring 54 mounted within an annular notch inside such female connector. Therefore, the electrical pulse produced by the simultaneous discharge of the storage modules is transmitted across the last spark gap 52 through the output electrode 50, the female connector 48 and the contact spring 54 to the male output connector. The output inductor 44 functions primarily to fix the quiescent voltage of the output connector 40 at ground to prevent such connector from floating to some indefinite voltage before discharge takes place, and to isolate the ground contact on the bottom storage module from the discharge pulse. A capacitor ring 56 may be mounted inside the output opening 42 in casing 10 so that such ring surrounds the male connector 40 and is insulatingly spaced therefrom and from such casing by the epoxy resin liner 22. A portion of the output voltage pulse produced on the male output connector is capacitively coupled to ring 56 and is transmitted through a hole 58 in the side of the casing to a cathode ray oscilloscope through a coupling resistor 60 in order to monitor such output pulse and to record its wave form. Of course an inductance loop may be employed in place of the capacitor ring if a current monitor signal is desired.

Figures 3, 4:
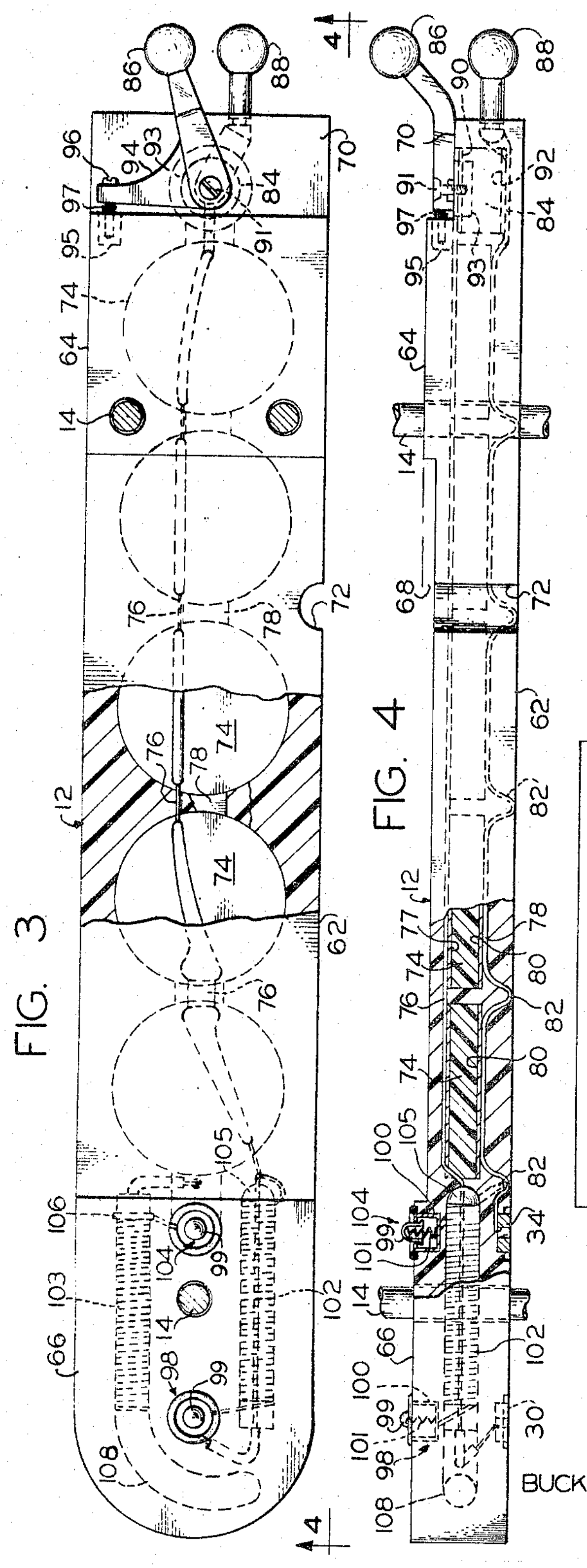
FIG. 3 is a plan view of one embodiment of the storage module employed in the pulser unit of FIGS. 1 and 2.
FIG. 4 is a side view of the storage module taken along the line 4—4 of FIG. 3.

The storage modules 12 of the present invention, shown in detail in FIGS. 3 and 4, include an elongated block 62 of transparent resin plastic or other suitable insulating material which may be employed as potting compound. One side of the module block may be provided with a pair of raised portions 64 and 66 on the opposite ends thereof which provide a space 68 between adjacent modules. One end of the module block may also be provided with a recessed portion 70 in order to provide clearance for the support stem of a spark gap electrode on such module to extend for a short distance between the adjacent modules without causing undesirable corona. In addition, the module blocks may also be provided with a keyway notch 72 in the sides thereof to enable the modules to be quickly in the proper orientation. A plurality of ceramic disc capacitors 74 are molded within the insulator block 62 along with a plurality of coupling inductors 76 connected to one of the plates 77 of the capacitors. A common ground strap 78 is provided for the capacitors 74 by soldering such strap to the plates 80 on the opposite side of such capacitors from plates 77. The ground strap 78 is provided with a plurality of outward extending portions 82 at positions between the capacitors in order to compensate for the distributed capacitance of coupling inductors 76 so that such inductors and capacitors provide a lump constant transmission line of substantially uniform characteristic impedance on the order of 3 ohms.

The structure just described results in a transmission line which is very close in electrical characteristics to a uniform strip transmission line. In fact, it is also possible to provide a distributed transmission line of the uniform strip type by employing a single, long, thin capacitor in place of the plurality of capacitors and their coupling inductors. A small ceramic output capacitor 84 is provided as part of the transmission line at the output end of such line and is connected through a coupling inductor and the ground strap in parallel with the other capacitors 74. A pair of spark gap electrodes 86 and 88 having end balls of spherical configuration threaded on one end thereof are attached directly to the plates 90 and 92, respectively, on opposite sides of the output capacitor 74. The electrode 88 extends perpendicular to the outer edge of the module block 62 with its other end embedded in such block and electrically connected to the capacitor plate 92. The other electrode 86 of at least some of the modules is pivotally mounted by a screw 91 threaded through the other end of such electrode into a pivot member 93 formed integral with the plate 90 of the output capacitor. An adjustment arm 94 of epoxy resin is molded onto one side of the electrode 86 and is secured to a threaded socket member 95 by an adjustment screw 96 extending through a hole in the end of such arm. A coil spring 97 is fitted around the adjustment screw 96 between the adjustment arm and the socket member. The width of the spark gap between electrode 86 of module 12 and the electrode 88 of the adjacent module 12' is varied by rotating the adjustment screw 96. This moves the adjustment arm 94 toward or away from the spring 97 which compresses or expands to allow pivotal movement of such arm about pivot screw 91 to pivot the electrode 86 on pivot member 92 and change the width of the spark gap.

The input ends of the transmission lines contained within the storage modules are each connected to a charging terminal 98 and may be in the form of a hollow contact button 99 having an externally threaded flange and a hollow metal cup 100 having an internally threaded shoulder terminating at the upper surface of the insulator block 62. The contact button 99 is threaded into the cup member 100 so that it is free to move within such cup member and is resiliently biased in a position extending partially out of such cup member by a coil spring 101 between the button and such cup member. The input ends of the transmission lines are also connected to the high voltage charging terminal 30 on the lower side of the insulator block which engages the contact button of the charging terminal 98 on the adjacent module 12'. An isolating inductance 102 is mounted within the storage module and connected between the charging terminal 98 and input terminal of the transmission line including capacitors 74 to prevent the discharge of the lines through such charging terminals. The ground strap 78 in each of the modules is similarly connected directly to the ground terminal 34 recessed below the lower surface of the insulator block, and is also connected through another isolating inductance 103 to another ground terminal 104 at the upper surface of such block which may include a spring biased contact button similar to charging terminal 98, that engages the ground terminal 34' on module 12'. The isolating inductance 102 may include a corona shield 105 in the form of a metal hemisphere on the end of such inductance connected to the input of the transmission line. Similarly the isolating inductance 103 may be provided with a metal corona ring 106 at one end thereof, while the other end of such inductance may be provided with a curved corona shield 108 in the form of a metal coated epoxy resin member.

Figure 5:
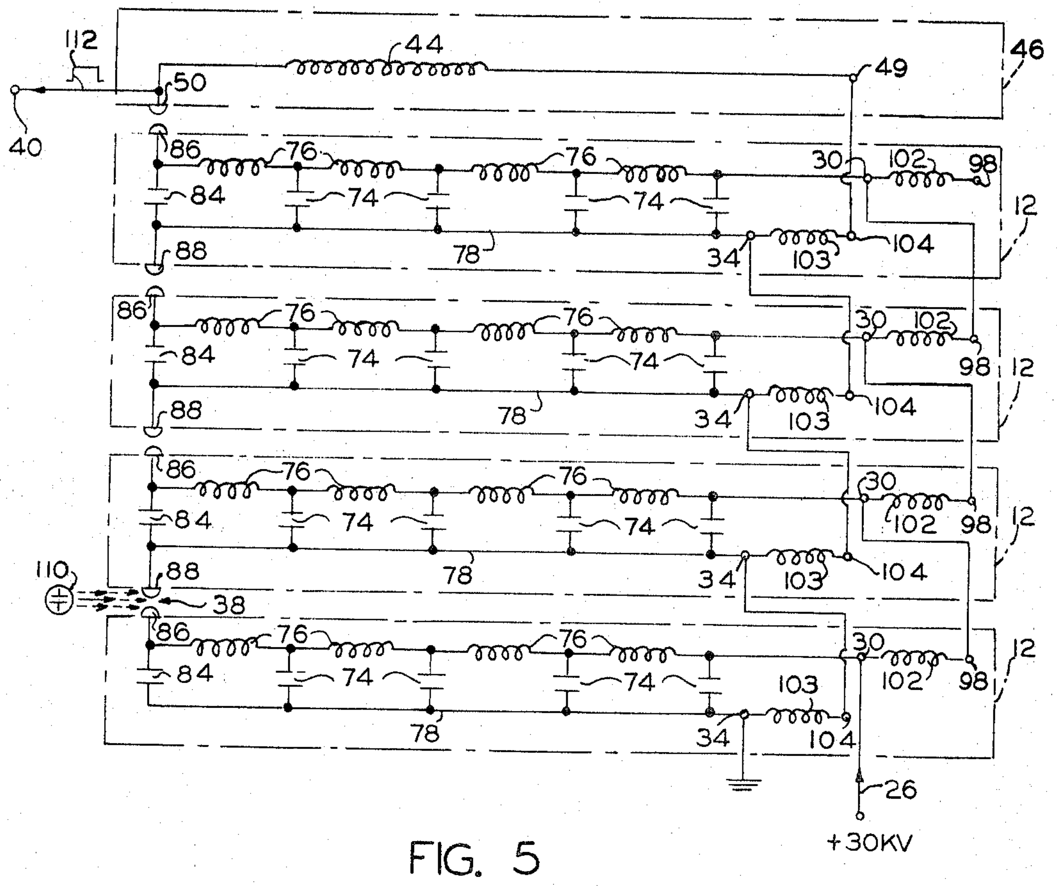
FIG. 5 is a schematic diagram of the electrical circuit of the pulser unit of FIGS. 1 and 2.

The electrical circuit of the pulse generator unit of FIGS. 1 and 2, is shown in FIG. 5. All of the storage modules 12 are charged by D.C. current flowing through the high voltage input cable 26 to the charging input terminals 30 of such modules. Twenty storage modules are employed and the transmission lines in the storage modules are charged in parallel through isolating inductances 102 and 103 to a voltage of about 30 kilovolts. The isolating inductances prevent the charge stored in the transmission lines of such modules from being transmitted back to the charging input cable 26 or to ground so that such lines are discharged in series only when all of the spark gaps between the electrodes 86 and 88 of adjacent modules break down. As indicated above, this discharge of all of the storage modules takes place substantially simultaneously by ionization of the gas in such spark gaps. A triggered source 110 of ultra violet light pulses is positioned adjacent the spark gap 38 so that a light pulse emitted therefrom together with the photo electrons emitted from the electrodes of the spark gap by such light pulse, ionize the gas in such spark gap and cause additional ultra violet light to be emitted from the spark gap so ionized. Since each of the spark gaps between adjacent modules is placed in a common light path, the ultra violet light produced by ionization of each spark gap travels with the speed of light substantially instantaneously to all of the other spark gaps to assist the over voltage breakdown of the remaining spark gaps. This allows each of the transmission lines of the plurality of storage modules 12 in the pulser unit to discharge at substantially the same time and generate twenty pulses of 15 kilovolts each which are added to prdouce an output pulse 112 of 300 kilovolts on the output terminal 40. This output pulse is a rectangular pulse of 5000 amperes and 300 kilovolts having a rise time less than 5 nanoseconds and a pulse width of about 50 nanoseconds. Because the spark gap electrodes 86 and 88 of the storage modules are positioned directly in contact with the plates of output capacitors 86, a substantial reduction in the output inductance of the storage modules is accomplished. This allows the output pulse of each module to have an extremely large current up to 5000 amperes and a rise time of 2 to 3 nanoseconds at a voltage of 15 kilovolts. This represents a current increase of approximately four times that of previous storage devices and a decrease in rise time by a factor of 10. Thus the total improvement of the storage module of the present invention is of the order of 40 times that of previous generators.

Figure 6:
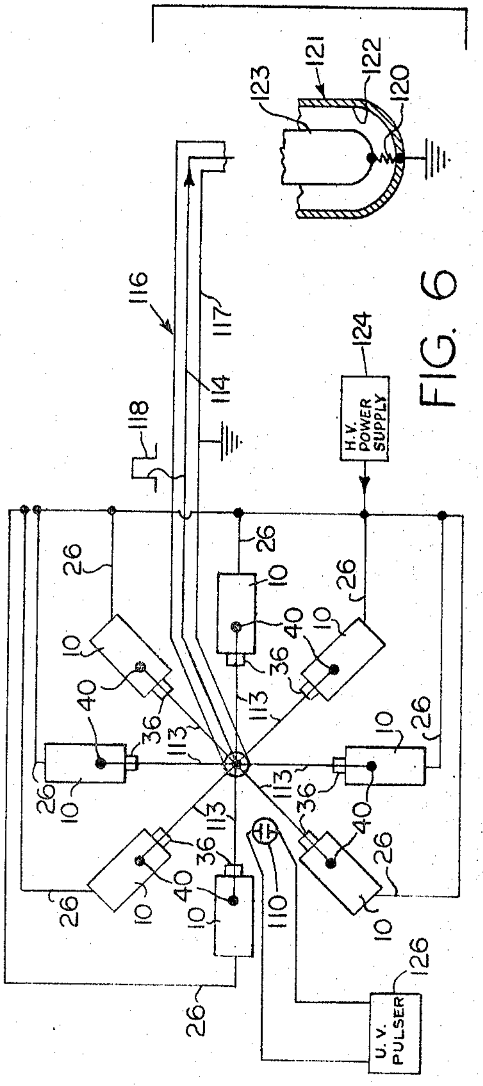
FIG. 6 is a schematic diagram of a system which employs the pulser units of the present invention for delivering high energy electrical pulses of short rise time and negligible time jitter to an exploding wire.
Figure 9:
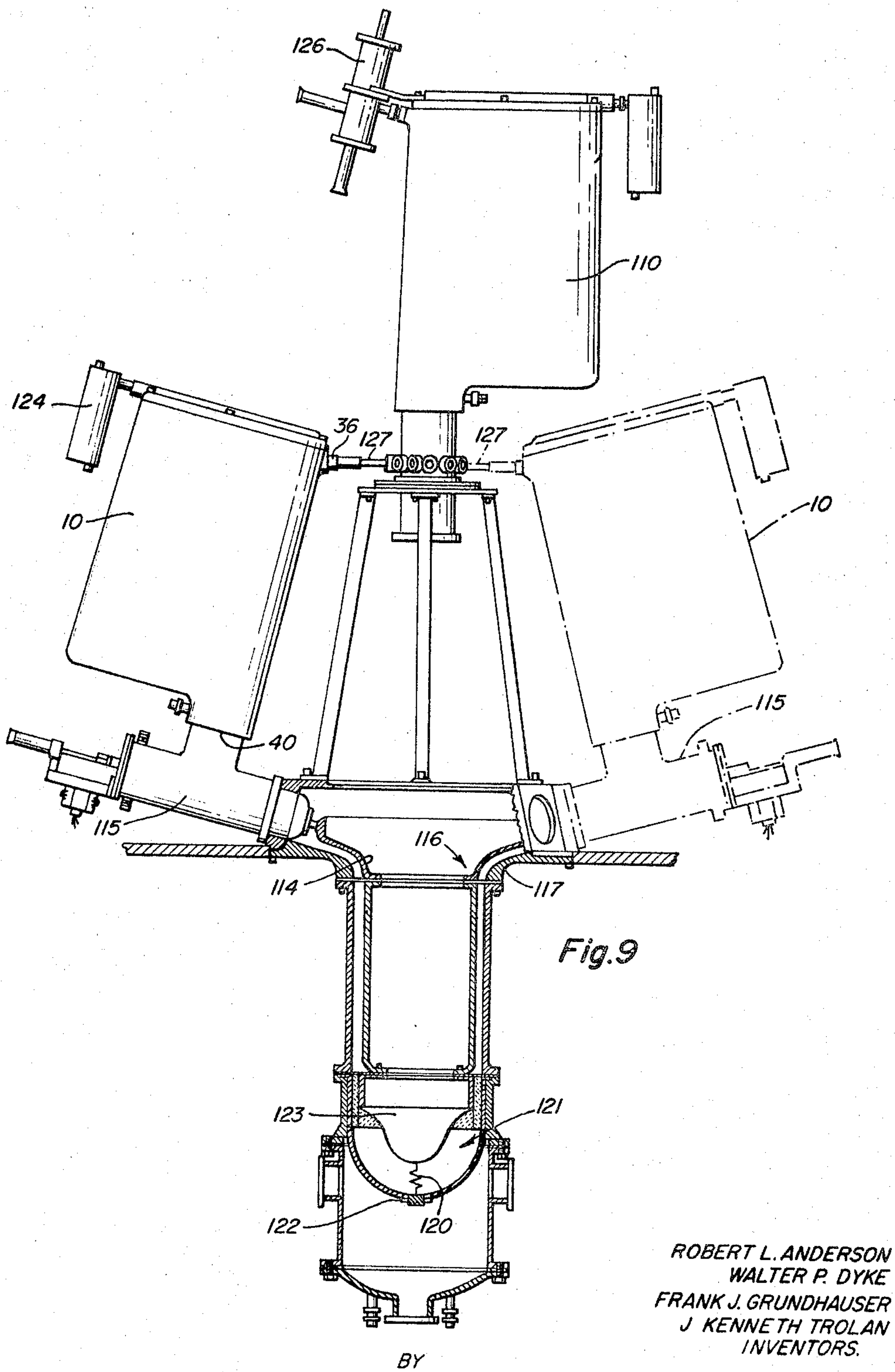
FIG. 9 is a plan view of one embodiment of an apparatus for the system of FIG. 6, with parts broken away for clarity.

When the pulse generator of the present invention is employed as a source of high energy electrical pulses for exploding wires or foils, it may be connected in the manner of FIGS. 6 and 9. A plurality of pulse generator units 10, such as fifteen, may be employed having their output terminals 40 connected in parallel to the inner signal conductor 114 of a common coaxial transmission line 116 whose outer shield conductor 117 is grounded, through the inner signal conductors 113 of coaxial transmission lines contained within discharge directive switches 115 each having 60 ohms characteristic impedance to match the output impedance of each pulser unit 10 and of the same length. The directive switches 115 are two position coaxial switches filled with insulating fluid, such as oil, which connect the outputs of the pulser units 10 to dummy load resistors in a first switch position and to the signal conductor 114 of the common output transmission line in a second switch position. Thus accidental discharge of the pulser units through the common output line is prevented by placing the directive switches in the first position while charging the storage modules and moving them to the second position immediately before triggering the ultra violet light source 110.

Only six of the pulser units 10 are shown in FIG. 6 and the outer conductors of the 60 ohm transmission lines as well as directive switches 115, have been omitted for the purposes of clarity. The common line 116 has a characteristic impedance equal to 4 ohms or one fifteenth that of the connection lines 113 because the outputs of such connection lines are in parallel. The input portion of the inner conductor 114 of the common output transmission line may have the conical funnel shape of FIG. 9 and is spaced from the outer conductor 117 and insulated therefrom by an oil filling. The common output line 116 transports the energy from each of the pulse generators as a single positive pulse 118 of 1000 joules having an extremely high current of the order of 75,000 amperes and high voltage of the order of 300 kilovolts to an exploding wire or foil 120. The wire 120 is positioned within an evacuated transducer chamber 121 which forms a continuation of the transmission line 116 and is shown on a larger scale in FIG. 6 than the transmission line. Thus the transducer has an outer wall 122 which forms part of the shield conductor 117 and is uniformly spaced from an inner member 123 forming part of the signal conductor 114. That is to say, the transmission line 116 is shown diagrammatically and its inner and outer conductors have related diameters similar to the members 123 and 122 of the transducer 121.

Both the inner member and outer walls of the transducer chamber are provided with hemispherical end portions and the wire 120 is connected between their centers so that it is the termination impedance of the transmission line 116. The charging input terminals 26 of each of the pulse generators 10 are connected in parallel to the output of a common high voltage source 124 which supplies the D.C. charging current for the storage modules in each of such pulse generators. Also, the ultra violet light source 110 is positioned so that the radiation emitted by such source is transmitted through the window aperture 36 of each of the pulse generator units 10 which may be positioned in a circle equally spaced from the input end of the transmission line. The radiation source 110 may itself be a modified pulser unit having an output spark gap provided at the end of output electrode 40 and containing nitrogen gas and is triggered by means of a suitable electrical pulser unit 126 to emit flashes of ultra violet light from the output spark gap of such pulser unit. Also the window apertures 36 of the pulser units may be connected to the interior of the ultra violet light source 110 by a plurality of coupling pipes 127 extending radially of the output spark gap of the light source to provide a common gas system for such pulser units and such light source so that the gases in all of the spark gaps are maintained at the some pressure to provide a more uniform breakdown voltage for such spark gaps. The radiation source 110 is shown in FIG. 6 displaced from a central position with respect to the units 10 for purposes of clarity, but it will be understood that the central position referred to above is the preferred position.

The individual output pulses of the pulse generators are added by the output line 116 to produce the final output pulse 118. This pulse addition increases the rise time of the output pulse only slightly because of the negligible time jitter between individual pulses 112. The small jitter is accomplished by the ultra violet triggering technique previously described which operates so well that the final output pulse 118 has a rise time less than 8 nanoseconds and a pulse width of about 50 nanoseconds in addition to the high current and high voltage characteristics mentioned previously. This enables the transfer of an extremely large amount of electrical energy on the order of 1000 joules to the wire 120 in a very short time to heat such wire to an extremely high temperature before such wire explodes. Obviously, the coaxial conductor 116 must have a high degree of coaxial symmetry and be of a characteristic impedance matching that of the transducer chamber 121 and parallel impedance of the pulse generators in order to prevent undesirable signal energy reflections of the final output pulse 118 from the ends of such coaxial conductor and from imperfections within the conductor itself. These signal reflections are extremely undesirable because they will distort the wave form of the final output pulse transmitted to the exploding wire 120 to increase the rise time of such pulse.

Figure 7:
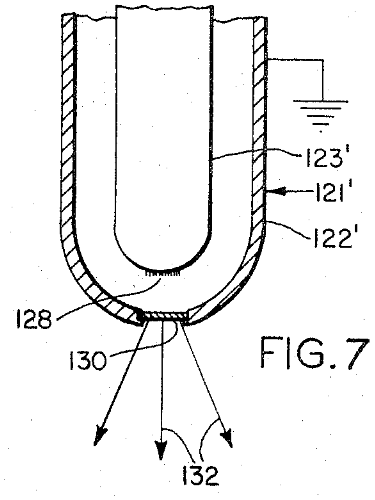
FIG. 7 shows one embodiment of an X-ray source which can be used in place of the exploding wire of FIG. 6.

The electrical pulse generator system of FIG. 6 can also employed to produce X-ray pulses of extremely high intensity by modifying the exploding wire transducer chamber 121 to provide a transducer chamber 121' shown in FIG. 7, which contains a plurality of field emission cathodes 128 and an X-ray emitter target 130. The cathodes 128 may be in the form of a knife edge or a plurality of sharp needles mounted on the spherical end of the inner member 123', so that such needles extend in spaced parallel relationship toward the target 130. An opening is provided in the center of the spherical end of the outer wall member 122' and a transmission type target 130 is mounted within such opening below cathodes 128 to enable the electrons emitted by such cathodes to strike the target and emit X-rays 132 from the outer surface of the target. Thus the target 130 also functions as a window in the outer wall to transmit the X-rays therethrough. The cathode needles may be made of tungsten and have tips with a radius of curvature of about $10^{-5}$ centimeter so that when the output pulse 118 reaches the cathodes it produces an extremely high electrical field adjacent their tips and causes electrons to be emitted therefrom by field emission during the application of such output pulse. If the output pulse 118 contains sufficient energy, a portion of the metal of the cathodes is vaporized into free metal ions which cause a vacuum arc between the cathodes and the target to enable an extremely high electron current to flow from the cathodes to such target for a short time. This vacuum arc operation produces short X-ray pulses of extremely high intensity.

Figure 8:
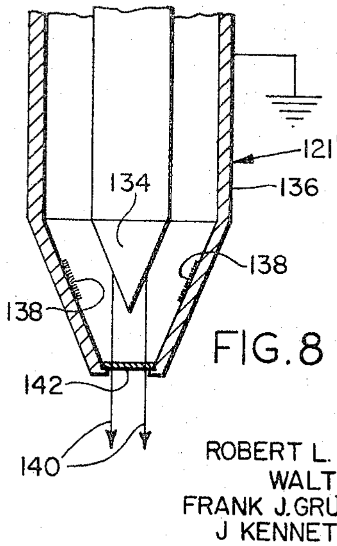
FIG. 8 is another embodiment of an X-ray source similar to that of FIG. 7.

Another embodiment of the trandsucer chamber is shown in FIG. 8 to be provided with an inner member having a conical target 134 of tungsten at one end thereof, and an outer wall member 136 having a similar shaped end portion on which are mounted a plurality of field emission cathodes 138. The cathodes may be in the form of spaced parallel needles provided in groups spaced about the conical inner surface of the wall member with the tips of such needles pointing toward the target 134. When a negative output pulse is transmitted to the cathodes 138, they emit electrons by field emission which strike the target 134 and produce X-rays 140 in a similar manner to that described above. The X-rays are emitted in a cone and transmitted through a thin window 142 of aluminum beryllium, or other suitable material covering a hole through the apex of the conical end of the outer wall 136. It should be noted that the conical anode or target 134 can be made of extremely small diameter and cooled by evaporating metal from the surface thereof in the manner disclosed in copending U.S. Patent application, Ser. No. 289,999, now Patent No. 3,309,523, entitled "X-RayTube Having Field Emission Cathode and Evaporative Anode, and Method of Operation" filed June 24, 1963 by W. P. Dyke and F. J. Grundhauser.

It will be obvious to those having ordinary skill in the art that various changes may be made in the details of the above described preferred embodiment of the present invention without departing from the spirit of the invention. For example, the widths of the spark gaps can be varied from outside the casings of the pulser units by providing shafts through the side of the casing 10, filler 22 and liner 20 for external adjustment of screws 96. Also the first spark gap 38 in each of the pulser units could be triggered by exposing it to X-rays, visible light, electrons or radioactive radiation by applying an electrical pulse to a trigger electrode positioned in such gap or by a combination of these methods. Therefore, the scope of the present invention should only be determined by the following claims.

We claim:

1. A system for producing electrical output pulses of high current and high voltage, comprising:

a plurality of pulse generator units each having a plurality of transmission lines therein which are connected in series at the output ends of said lines through spark gap electrodes forming a plurality of spark gaps supported in a common light path for discharging said lines in series to produce an electrical pulse at the output of each pulse generator unit whose voltage corresponds to the sum of the charge voltages on said lines;

charging means for applying a D.C. voltage to the transmission lines in each of said pulse generator units to charge said transmission lines;

trigger means including a source of ionizing electromagnetic radiation for simultaneously irradiating at least one spark gap of each of said units, to enable all of said spark gaps to break down at substantially the same time so that the transmission lines discharge and generate a plurality of electrical discharge pulses at the outputs of said plurality of pulse generator units substantially simultaneously; and means for connecting the outputs of said plurality of pulse generator units in parallel to produce an output pulse whose current is substantially equal to the sum of the currents of the discharge pulses of said units and whose rise time is short due to the low output inductance of the system and the simultaneous production of said discharge pulses.

2. A system in accordance with claim 1 which also includes means for connecting all of the pulse generator units to a common gas source to provide the same gas pressure in all spark gaps so that the spark gaps have substantially the same breakdown voltage which may be varied by changing the gas pressure.

3. A system in accordance with claim 1 in which the trigger means includes a single source of ultraviolet light which irradiates at least one spark gap in each of the pulse generator units to ionize the gas in such spark gap and cause it to break down.

4. A system in accordance with claim 1 which also includes an electron discharge device having a field emission cathode and connected as a load to the output of said system.

5. A system for producing electrical output pulses of high current and high voltage having fast rise times, comprising:

a plurality of pulse generator means each having a plurality of storage modules containing transmission lines therein which are connected in series at the output ends of said lines by a plurality of spark gaps supported in a common light path for producing an electrical pulse at the output of each of pulse generator means whose voltage corresponds to the sum of the charge voltages on said lines;

charging means for applying a D.C. voltage to the input ends of the transmission lines in each of said pulse generator means to charge said transmission lines to said voltage;

,discharge means including a single source of ionizing electromagnetic radiation for irradiating at least one of the spark gaps of each of said pulse generator means with electromagnetic radiation pulses to cause all of said spark gaps to break down at substantially the same time so that the transmission lines discharge and generate a plurality of electrical discharge pulses at the outputs of said plurality of pulse generator means substantially simultaneously;

means for connecting the outputs of said plurality of pulse generator means in parallel to produce an output pulse without any appreciable signal reflection whose current is substantially equal to the sum of the currents of said discharge pulses and whose rise time and width are similar to that of one of said discharge pulses; and means for applying said output pulse to an electrical resistance element to heat said element to an extremely high temperature before causing said element to explode.

6. A system for producing short X-ray pulses of high intensity, comprising:

a plurality of pulse generator means each having a plurality of storage modules containing transmission lines therein which are connected in series at the output ends of said lines by a plurality of spark gaps supported in a common light path for producing an electrical pulse at the output of each of pulse generator means whose voltage corresponds to the sum of the charge voltages on said lines;

charging means for applying a D.C. voltage to the transmission lines in each of said pulse generator means to charge said transmission lines;

discharge means for irradiating at least one of the spark gaps of each of said pulse generator means with light to cause all of said spark gaps to break down at substantially the same time so that the transmission lines discharge and generate a plurality of electrical discharge pulses at the outputs of said plurality of pulse generator means substantially simultaneously;

means for connecting the outputs of said plurality of pulse generator means in parallel to reduce the output inductance of the system and to produce an output pulse whose current is substantially equal to the sum of the currents of said discharge pulses and whose rise time and width are approximately equal to that of one of said discharge pulses;

an X-ray emitting target;

field emission cathode means supported in closely spaced relationship to said target; and means for applying said output pulse between said cathode means and said target to cause electrons to be emitted from said cathode means by field emission and to bombard said target so that X-rays are emitted from said target.

7. A system for producing short X-ray pulses of high intensity and fast rise time, comprising:

a plurality of pulse generator means each having a plurality of storage modules containing lumped constant transmission lines therein which are connected in series at the output ends of said lines by a plurality of spark gaps supported in a common light path for producing an electrical pulse at the output of each of pulse generator means whose voltage corresponds to the sum of the charge voltages on said lines;

charging means for applying a D.C. voltage to the input ends of the transmission lines in each of said pulse generator means to charge said transmission lines to said voltage;

discharge means for irradiating at least one of the spark gaps of each of said pulse generator means with ultra-violet light to cause all of said spark gaps to break down at substantially the same time so that the transmission lines discharge and generate a plurality of electrical discharge pulses at the outputs of said plurality of pulse generator means substantially simultaneously; and means including a coaxial, output transmission line having an inner signal conductor and an outer shield conductor, for connecting the outputs of said plurality of pulse generator means in parallel to produce an output pulse without any appreciable signal reflection whose current is substantially equal to the sum of the currents of said discharge pulses;

an X-ray emitting target connected to the end of one of the conductors of said output transmission line;

field emission cathode means including a plurality of spaced needles, connected to the end of the other of the conductors of said output line and supported so that the points of said needles are positioned substantially the same distance from said target; and means for applying said output pulse between said cathode means and said target to cause electrons to be emitted from said needles and to bombard said target so that a pulse of X-rays is emitted from said target during the appplication of said output pulse.

8. A high energy electrical pulse generator including a plurality of storage modules containing lumped constant transmission lines formed by interconnected capacitors and inductances, and which are supported so that the transmission lines are connected together through spark plug gaps provided by spark gap electrodes attached to the modules in order to discharge the transmission lines to produce a high energy output pulse when the spark gaps break down, the improvement comprising:

mounting means provided on the storage modules for mounting a pair of spark gap electrodes directly on the opposite terminal plates of one of the capacitors in each module, and for enabling at least one of the electrodes to be pivoted on its associated capacitor plate by movement of an adjustment arm extending laterally from said one electrode.

9. A pulse generator in accordance with claim 8 in which the storage modules are elongated plates of plastic material within which the transmission lines are embedded and the spark gap electrodes are attached to the ends of said plates, with the plates being supported in stacked relationship on alignment rods passing through said plates and attached to the cover of a housing containing the storage modules.

References Cited

UNITED STATES PATENTS

| | | | |
|---|---|---|---|
| 2,470,550 | 5/1949 | Evans | 333—29 X |
| 1,821,698 | 9/1931 | Fisher | 313—100 X |
| 2,534,758 | 12/1950 | Titterton | 307—110 X |
| 2,931,948 | 4/1960 | Forgacs | 315—241 |
| 3,141,111 | 7/1964 | Godlove | 315—181 |
| 3,248,574 | 4/1966 | Dyke et al. | 307—110 |
| 3,256,439 | 6/1966 | Dyke et al. | 307—110 X |

BERNARD KONICK, *Primary Examiner.*

J. F. BREIMAYER, *Assistant Examiner.*

U.S. Cl. X.R.

250—102; 307—110; 313—147; 315—155, 156; 317—80; 333—29

UNITED STATES PATENT OFFICE

CERTIFICATE OF CORRECTION

Patent No. 3,432,663 March 11, 1969

Robert L. Anderson et al.

It is certified that error appears in the above identified patent and that said Letters Patent are hereby corrected as shown below:

Column 9, line 22, after "also" insert -- be --. Column 12, line 34, car "plug"; same column 12, list of References Cited, add the following references

| | | | |
|---|---|---|---|
| 2,472,115 | 6/1949 | Mayer --------------- | 313-147 |
| 2,776,411 | 1/1957 | Anderson ----------- | 333-29 |
| 2,823,354 | 2/1958 | Lubkin ------------- | 333-29 |

Signed and sealed this 31st day of March 1970.

(SEAL)
Attest:

Edward M. Fletcher, Jr.
Attesting Officer

WILLIAM E. SCHUYLER, JR.
Commissioner of Patents